(12) United States Patent
Jordan

(10) Patent No.: US 9,914,332 B2
(45) Date of Patent: Mar. 13, 2018

(54) TRAILER HITCH ASSEMBLY FOR A VEHICLE

(71) Applicant: Ford Global Technologies, LLC, Dearborn, MI (US)

(72) Inventor: Marcus Jordan, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/175,138

(22) Filed: Jun. 7, 2016

(65) Prior Publication Data

US 2017/0349016 A1    Dec. 7, 2017

(51) Int. Cl.
| | | |
|---|---|---|
| *B60D 1/56* | (2006.01) | |
| *B60D 1/52* | (2006.01) | |
| *B60D 1/04* | (2006.01) | |

(52) U.S. Cl.
CPC .................. *B60D 1/52* (2013.01); *B60D 1/04* (2013.01); *B60D 1/56* (2013.01)

(58) Field of Classification Search
CPC ............... B60D 1/52; B60D 1/04; B60D 1/56
See application file for complete search history.

(56) References Cited

U.S. PATENT DOCUMENTS

| | | | | |
|---|---|---|---|---|
| 6,626,450 B2 * | 9/2003 | Braun | .................... | B60D 1/485 280/500 |
| 6,739,613 B2 | 5/2004 | Aquinto et al. | | |
| 8,091,913 B1 * | 1/2012 | White | .................... | B60D 1/06 280/456.1 |
| 8,678,423 B1 | 3/2014 | Hwang | | |
| 9,340,172 B2 * | 5/2016 | Kim | .................... | B21D 53/88 |
| 9,731,569 B2 * | 8/2017 | McGuckin | ............. | B60D 1/485 |
| 2002/0149173 A1 * | 10/2002 | Palmer | .................... | B60D 1/485 280/495 |
| 2004/0021295 A1 * | 2/2004 | Westerdale | ............ | B60D 1/485 280/495 |
| 2005/0121880 A1 | 6/2005 | Santangelo | | |
| 2005/0212311 A1 * | 9/2005 | Haneda | .................. | B60D 1/565 293/117 |
| 2007/0063482 A1 * | 3/2007 | Binkowski | ............. | B60D 1/485 280/495 |
| 2009/0206577 A1 * | 8/2009 | Kozuka | .................... | B60D 1/06 280/495 |
| 2009/0218788 A1 * | 9/2009 | Hughes | .................. | B60D 1/485 280/495 |

(Continued)

*Primary Examiner* — Kevin Hurley
*Assistant Examiner* — Marlon A Arce
(74) *Attorney, Agent, or Firm* — Jason C. Rogers; Brooks Kushman P.C.

(57) ABSTRACT

A trailer hitch assembly for a vehicle includes a tubular beam, a trailer hitch, and a barrel nut. The tubular beam includes a first end sized for disposal within a first vehicle frame bracket, a second end sized for disposal within a second vehicle frame bracket, and a lowered portion therebetween. The tubular beam defines a through-hole at one of the ends. The trailer hitch is mounted to the lowered portion. The barrel nut extends through the through-hole, is secured to the tubular beam, and defines a cavity. The first vehicle frame bracket may define a first ring sized to receive the first end of the tubular beam. The second vehicle frame bracket may define a second ring sized to receive the second end of the tubular beam.

18 Claims, 6 Drawing Sheets

(56) References Cited

U.S. PATENT DOCUMENTS

| | | | |
|---|---|---|---|
| 2012/0066979 A1* | 3/2012 | Brown | B60R 19/48 49/463 |
| 2013/0056959 A1* | 3/2013 | Mathes | B62D 21/152 280/504 |
| 2016/0107493 A1* | 4/2016 | Krieger | B60D 1/48 280/495 |
| 2016/0214450 A1* | 7/2016 | McGuckin | B60D 1/488 |
| 2016/0311281 A1* | 10/2016 | Mantovani | B60D 1/52 |

* cited by examiner

TRAILER HITCH ASSEMBLY FOR A VEHICLE

TECHNICAL FIELD

The present disclosure relates to assemblies for a rear portion of a vehicle including trailer hitch assemblies.

BACKGROUND

Trailer hitches are used to attach a trailer to a vehicle. Various trailer hitch designs are available depending on type of vehicle and type of trailer. For example, a trailer hitch may be structured to facilitate towing a boat. The trailer hitch may be located on a rear portion of the vehicle and spaced from an underlying surface. Vehicles may also include vehicle components to assist in tow recovery operations. Tow recovery operations may include a use of a winch or tow straps to assist in moving the vehicle when the vehicle is stuck.

SUMMARY

A trailer hitch assembly for a vehicle includes a tubular beam, a trailer hitch, and a barrel nut. The tubular beam includes a first end sized for disposal within a first vehicle frame bracket, a second end sized for disposal within a second vehicle frame bracket, and a lowered portion therebetween. The tubular beam defines a through-hole at one of the ends. The trailer hitch is mounted to the lowered portion. The barrel nut extends through the through-hole, is secured to the tubular beam, and defines a cavity. The first vehicle frame bracket may define a first ring sized to receive the first end of the tubular beam. The second vehicle frame bracket may define a second ring sized to receive the second end of the tubular beam. The barrel nut may be secured to the tubular beam via welding. Each of the first end of the tubular beam and the second end of the tubular beam may be located adjacent a c-pillar region defined by a vehicle frame of which the trailer hitch assembly is secured to. The tubular beam may define a substantially square profile. The cavity may be sized to receive a tow hook. A fascia may be mounted to the vehicle frame to partially conceal the tubular beam and may define a cover hole in substantial registration with the through-hole. A cap may be sized for mounting to the fascia at the cover hole to prevent access to the barrel nut.

An assembly for a rear portion of a vehicle includes frame rails, first and second frame brackets, a tubular beam, a trailer hitch, and a cylindrical nut. The frame rails support a vehicle frame. The first frame bracket defines a first pair of rings and is secured to one of the frame rails. The second frame bracket defines a second pair of rings and is secured to another of the frame rails. The tubular beam spans between and is secured to the frame brackets via the rings. The tubular beam includes a central lowered portion and defines a beam through-hole located between one of the first pair of rings or the second pair of rings. The trailer hitch is secured to the central lowered portion. The cylindrical nut is sized for disposal within the beam through-hole and defines a cavity sized to receive a vehicle component. The tubular beam may define a shape extending downward at an angle from a first end to the central lower portion and extending downward at an angle from a second end to the central lower portion such that the central lower portion is offset from the first end and the second end. The tubular beam may define a substantially square profile. Each of the first pair of rings and the second pair of rings may be located adjacent one of two c-pillar regions of the vehicle frame. The cavity may be sized to receive a tow hook. A fascia may be mounted to the vehicle frame to at least partially conceal the tubular beam and may define an aperture in substantial registration with the beam through-hole. A cap may be sized for mounting to the fascia and to cover the aperture to prevent access to the cylindrical nut. A c-shaped bracket defining a bracket through-hole in substantial registration with the beam through-hole may be mounted to the tubular beam between one of the pairs of rings to receive the cylindrical nut.

A vehicle includes a vehicle frame and a trailer hitch assembly. The vehicle frame includes c-pillar regions and a pair of frame rails. The trailer hitch assembly includes a tubular beam, a pair of frame brackets, and a nut. The tubular beam includes a first end located adjacent one of the c-pillar regions, a second end adjacent another of the c-pillar regions, and a central portion between the first end and the second end. The tubular beam defines a beam through-hole at one of the ends. Each of the frame brackets is secured to one of the frame rails and each defines a ring portion sized to receive one of the tubular beam ends. The nut is sized for disposal within the beam through-hole and defines a cavity to receive a vehicle component therein. A trailer hitch may be secured to the central portion of the tubular beam. A central axis defined by the nut may be parallel with a longitudinal axis defined by one of the pair of frame rails. An inner surface of the cavity of the nut may be threaded to receive the vehicle component. The central portion of the tubular beam may be offset and lower than the first and second ends of the tubular beam relative to an underlying surface. A c-shaped bracket may define a bracket through-hole in substantial registration with the beam through-hole and sized to receive the nut.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
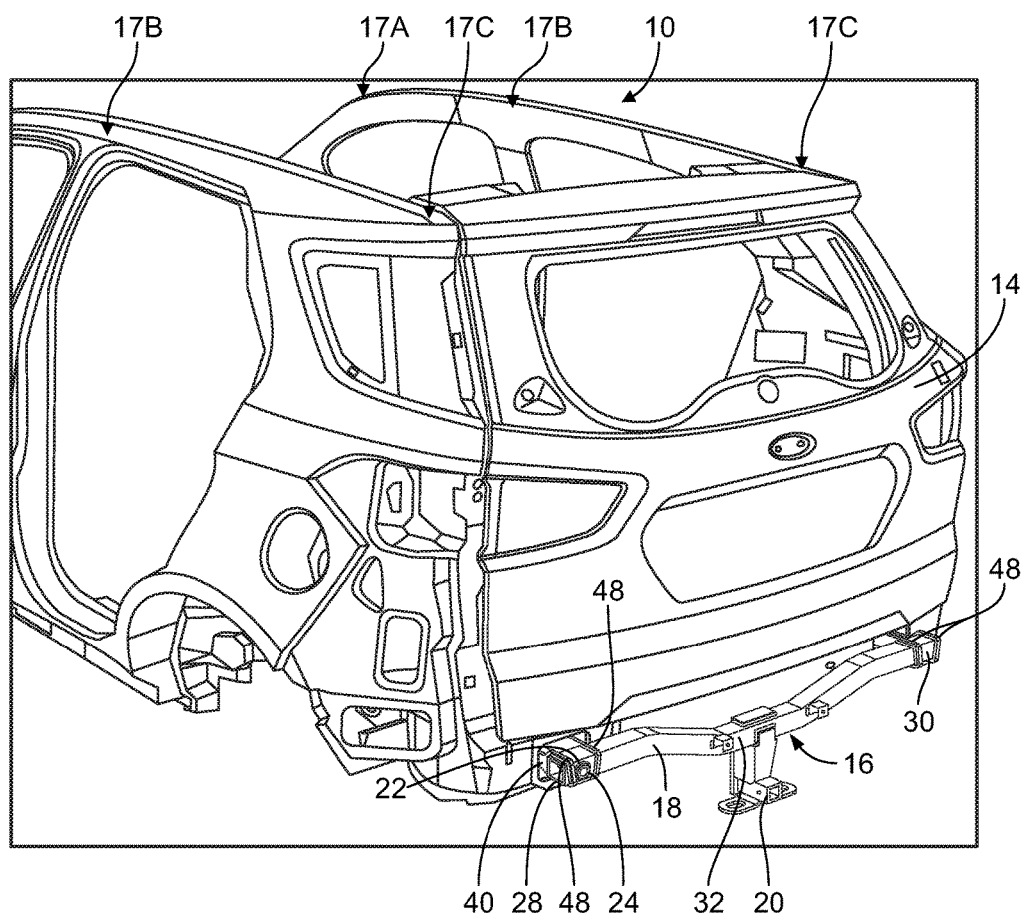
FIG. 1 is a partial rear perspective view of an example of a portion of a vehicle frame.
Figure 2:
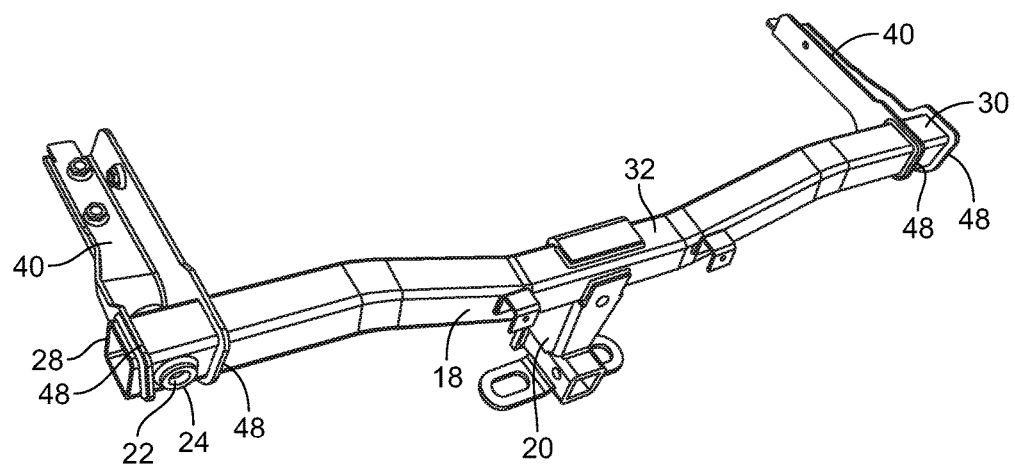
FIG. 2 is a perspective view of an example of a portion of a trailer hitch assembly of the vehicle frame of FIG. 1.
Figure 3:
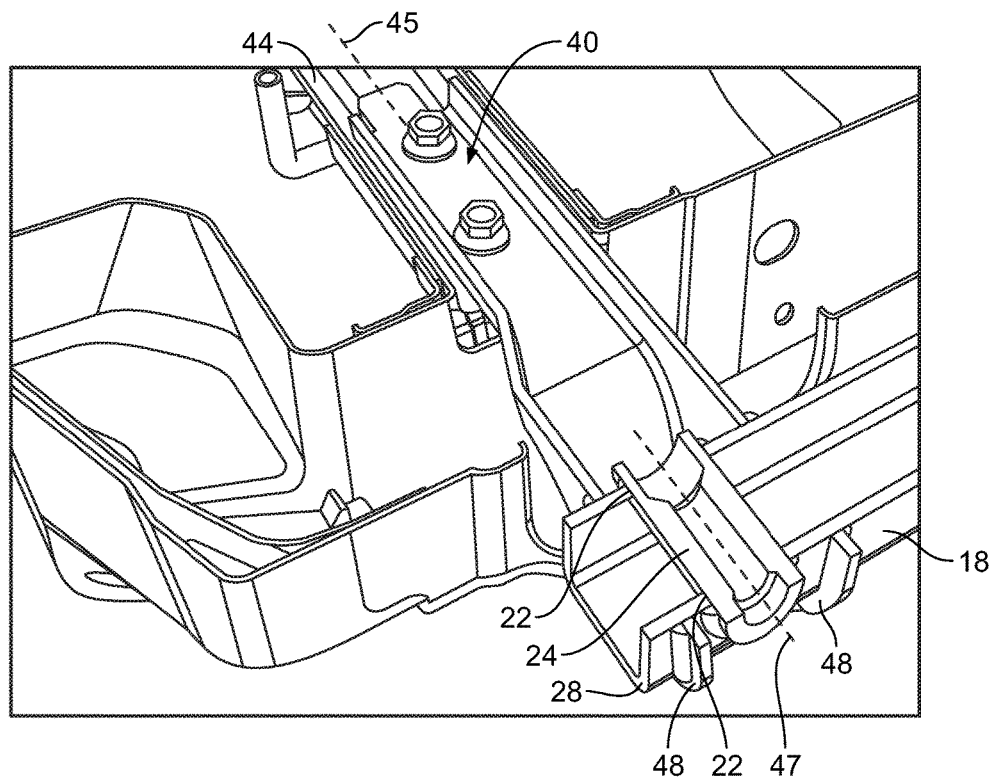
FIG. 3 is a perspective view, in cross-section, of a portion of the trailer hitch assembly of FIG. 2.
Figure 4:
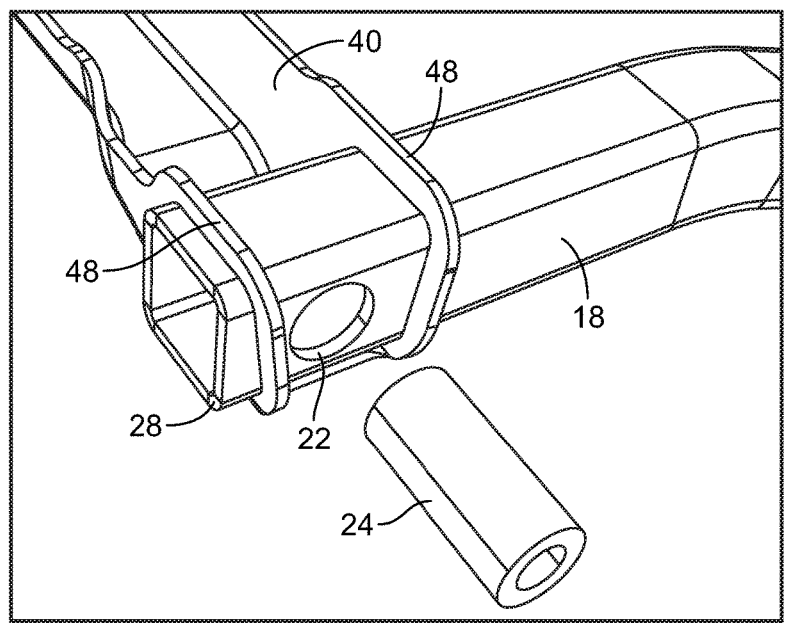
FIG. 4 is a perspective view of a portion of the trailer hitch assembly of FIG. 2.
Figure 5:
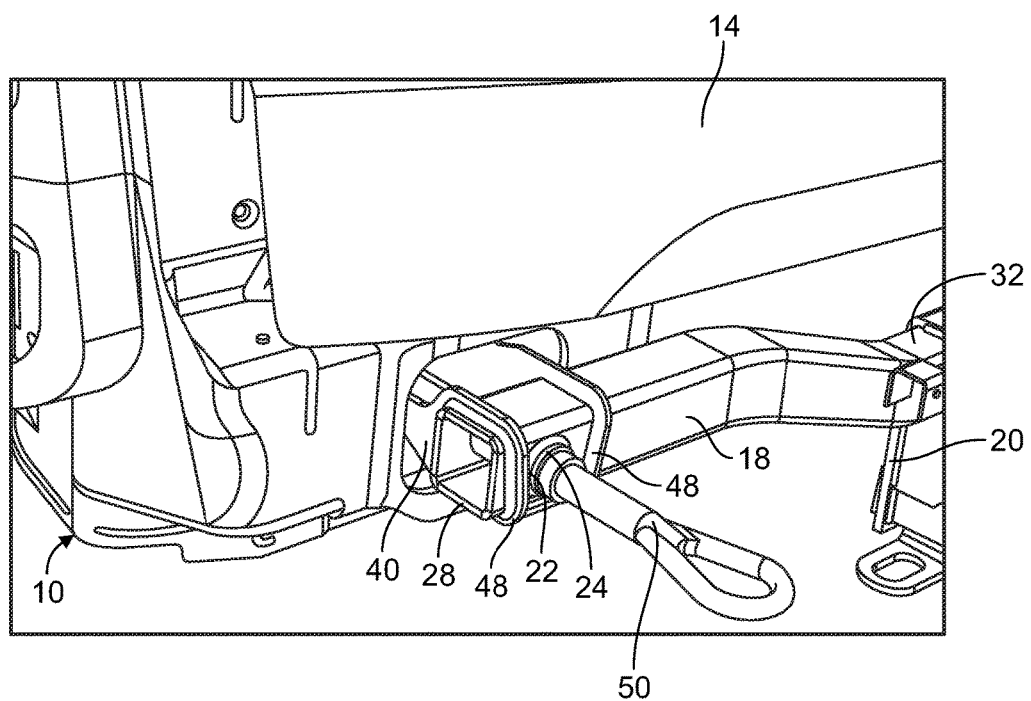
FIG. 5 is a perspective view of a portion of the trailer hitch assembly of FIG. 2 showing a tow hook installed on the trailer hitch assembly of FIG. 2.

Referring to FIG. 1, an example of a portion of a vehicle frame is illustrated, referred to generally as a vehicle frame 10. A rear hatch 14 may be mounted to a rear portion of the vehicle frame 10. The rear hatch 14 may pivot between at least closed and open positions. A trailer hitch assembly 16 may be mounted to a rear portion of the vehicle frame 10. The vehicle frame 10 may include an a-pillar region 17a, a b-pillar region 17b, and a c-pillar region 17c. The illustrated vehicle frame 10 is shown as a four door configuration an including the hatch 14; however other configurations, such as a two door configuration may be adopted to incorporate the disclosed concepts. Alternate configurations may include different pillar region references than the vehicle frame 10.

Now additionally referring to FIGS. 2 through 5, the trailer hitch assembly 16 may include a tubular beam 18, a trailer hitch 20, a through-hole 22, and a nut 24. The tubular beam 18 includes a first end 28 and a second end 30 opposite the first end 28. In one example, the tubular beam 18 may define a substantially square profile. It is contemplated that the tubular beam 18 may define a substantially circular profile or other shaped profile. A surface of the tubular beam 18 may define a cavity such that the tubular beam 18 is hollow. A central portion 32 of the tubular beam 18 is offset from the first end 28 and the second end 30. For example, portions of the tubular beam 18 may extend downward to the central portion 32 such that the central portion 32 is closer to an underlying surface in comparison to the first end 28 and the second end 30.

The trailer hitch 20 may be secured to the tubular beam 18 at the central portion 32. Various fastening methods are available to secure the trailer hitch 20 to the tubular beam 18, such as welding. The through-hole 22 may be defined by the tubular beam and disposed adjacent the first end 28 or the second end 30. The through-hole 22 may be sized to receive the nut 24. The nut 24 may be, for example, a barrel nut defining a cavity to receive a vehicle component. The nut 24 may be cylindrical in shape and include a threaded inner surface to receive the vehicle component, such as a tow hook as described below. The nut 24 may be secured to the tubular beam 18 via various fastening methods. In one example, the nut 24 may be welded to the tubular beam 18. In another example, the nut 24 may be secured to the tubular beam 18 via a separate bracket assembly as described below.

A pair of frame brackets 40 may be mounted to a portion of the vehicle frame 10, such as a frame rail 44. The frame rail 44 may define a longitudinal axis 45 parallel to a central axis 47 defined by the nut 24. Each of the frame brackets 40 may include rings 48 spaced from one another and each ring 48 defining an opening for the tubular beam 18 to extend therethrough. For example, the first end 28 and the second end 30 of the tubular beam 18 may be secured within each of the respective rings 48. Each of the rings 48 may be sized and shaped in accordance with a size and a shape of the tubular beam 18. For example, the rings 48 may define a substantially square shape sized to receive the tubular beam 18 when the tubular beam 18 defines a substantially square profile. The tubular beam 18 may be secured to the frame bracket 40 via various fastening methods. In one example, the tubular beam 18 may be welded to the frame bracket 40 and such that the tubular beam 18 extends through the opening of the frame bracket 40. In another example, the tubular beam 18 may be secured to the frame bracket 40 via mechanical fasteners such as bolts or threaded nuts in lieu of welding. The tubular beam 18 may be mounted to the frame bracket 40 at a location adjacent a lower portion of one of the c-pillar regions 17c.

A tow hook 50 may be sized for disposal within the nut 24. For example, the tow hook 50 may include a threaded end for securing to a threaded inner surface of the nut 24. The tow hook may be shaped like an eye hook. The tow hook 50 may assist in providing tow recovery operations. For example, the tow hook 50 may be secured to the trailer hitch assembly 16 to provide a mounting location for tow straps or a winch to assist in moving the vehicle when stuck.

Figure 6:
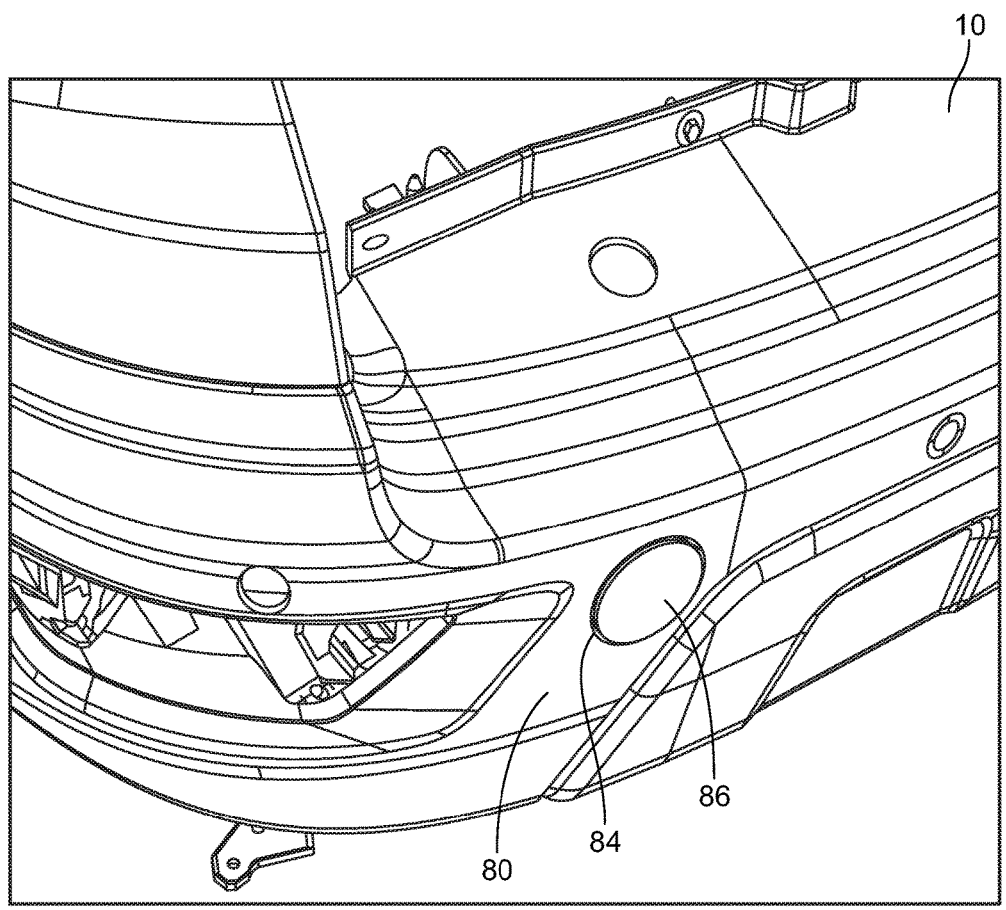
FIG. 6 is a perspective view of a portion of the vehicle frame of FIG. 1 shown with additional vehicle components secured to the vehicle frame.
Figure 7:
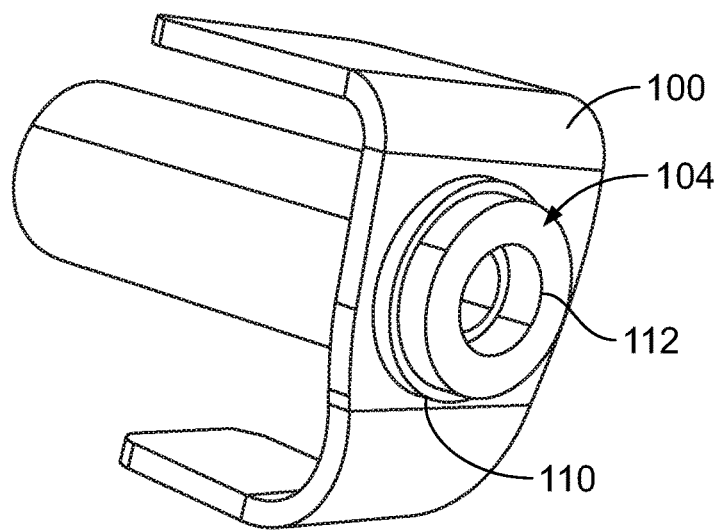
FIG. 7 is a perspective view of an example of a barrel nut assembly of a trailer hitch assembly.
Figure 8:
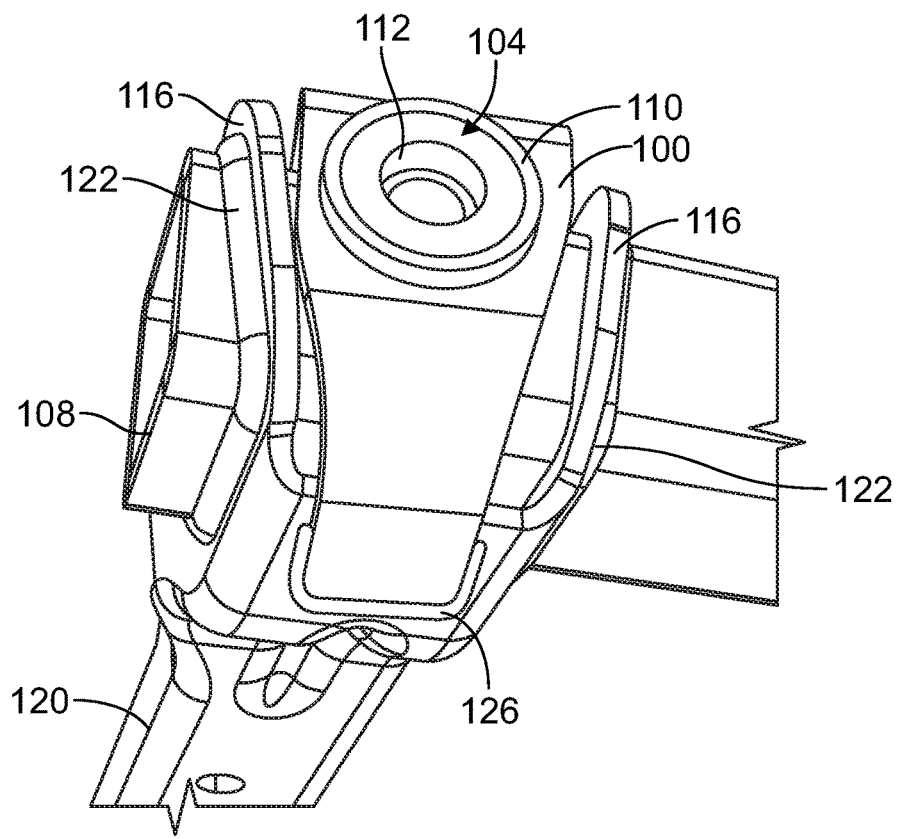
FIG. 8 is a perspective view of the barrel nut assembly of FIG. 7 shown mounted to a portion of a trailer hitch assembly.
Figure 9:
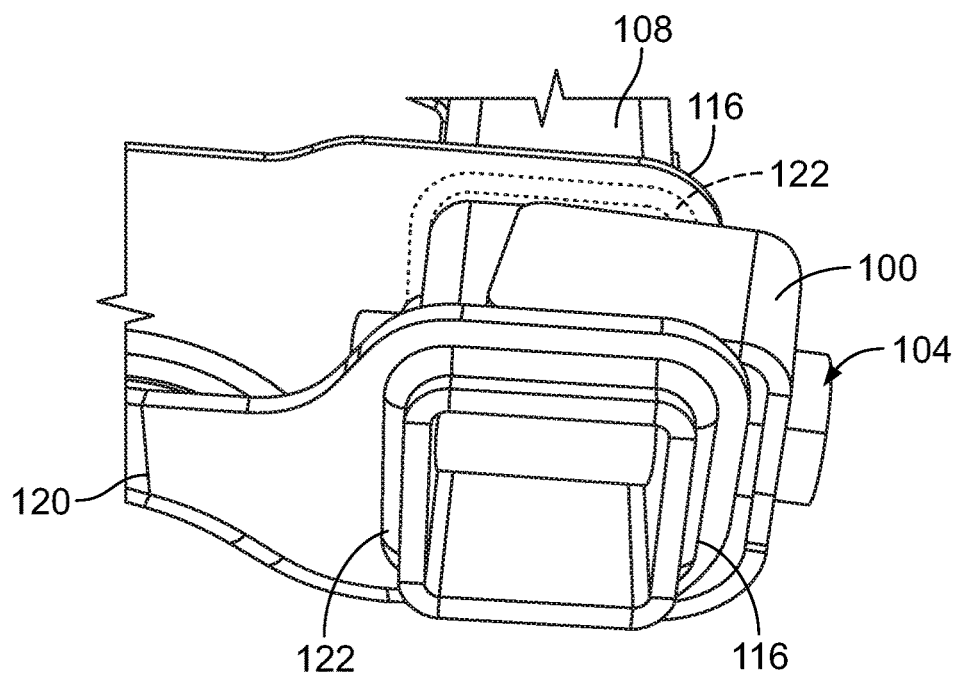
FIG. 9 is a perspective view of the barrel nut assembly of FIG. 7 shown mounted to a portion of a trailer hitch assembly.
Figure 10:
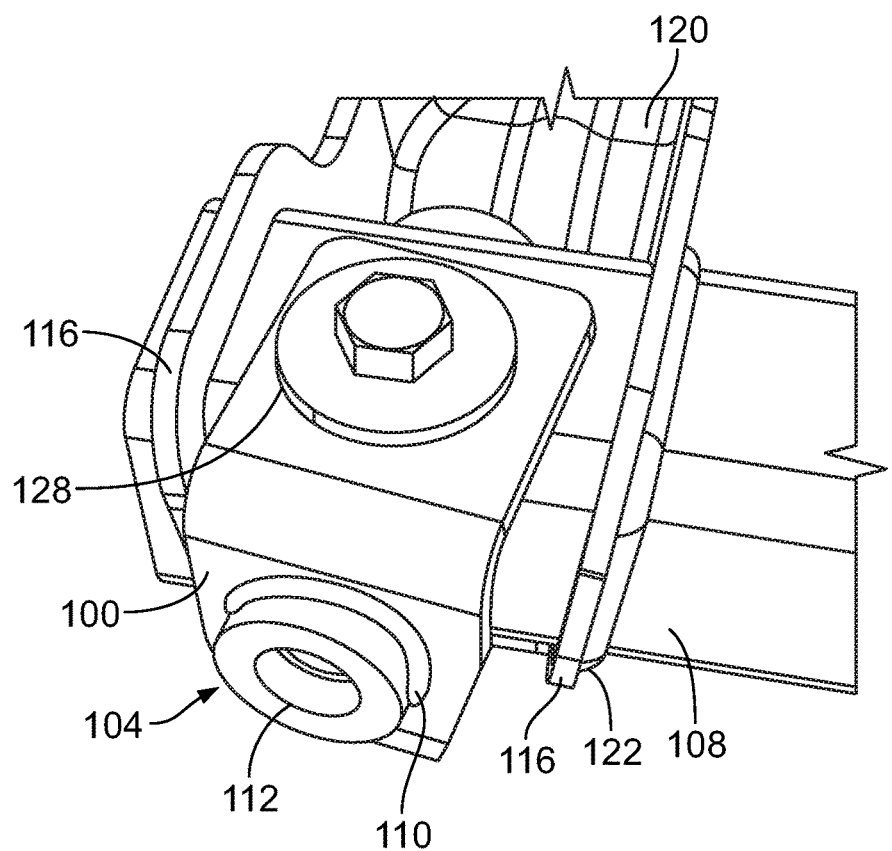
FIG. 10 is a perspective view of the barrel nut assembly of FIG. 7 shown mounted to a portion of a trailer hitch assembly.

FIG. 6 shows a portion of the vehicle frame 10 with outer body vehicle components secured thereto. For example, a rear fascia 80 may be secured to the vehicle frame 10. The rear fascia 80 may be arranged with the vehicle frame 10 such that the rear fascia 80 partially conceals portions of the trailer hitch assembly 16. The rear fascia 80 may define an aperture 84. The aperture 84 may be in substantial registration with the through-hole 22 such that the nut 24 is accessible via the aperture 84. A cap 86 may be sized to enclose the aperture 84. For example, the cap 86 may operate as a cover to the aperture 84 and be sized to mount to the rear fascia 80 to prevent access to the nut 24. The cap 86 may be removed to provide access to the nut 24 and such that a vehicle component, for example the tow hook 50, may be installed within the nut 24.

FIGS. 7 through 10 show another example of a portion of a trailer hitch assembly in which a barrel nut is mounted thereto. For example, a bracket 100 may define an aperture sized to receive a nut, such as a barrel nut 104. The bracket 100 may be c-shaped and sized for mounting to a tubular beam 108 and a portion of a vehicle frame. The barrel nut 104 may be secured to the bracket 100 via a weld 110. The barrel nut 104 may define a through-hole 112 sized to receive a vehicle component, such as the tow hook 50 described above. For example, the through-hole 112 may be threaded to receive threads of the tow hook 50.

The tubular beam 108 may define a substantially square profile. The tubular beam 108 may be part of a trailer hitch assembly, such as the trailer hitch assembly 16 described above. The tubular beam 108 may be sized to extend through two rings 116 of a frame member 120 and be secured thereto via welds 122. The tubular beam 108 may define a beam through-hole in substantial registration with the bracket 100 aperture for the barrel nut 104 to extend therethrough. The rings 116 may be sized according to a shape of the tubular beam 108 to receive the same.

The bracket 100 may be secured to the frame member 120 and the tubular beam 108. For example, the bracket 100 may be secured to the frame member 210 via a weld 126 and the bracket 100 may be secured to the tubular beam 108 via mechanical fastener 128. Alternatively, the bracket 100 may be secured to the tubular beam 108 via a weld (not shown).

The bracket 100 may be disposed adjacent an end of the tubular beam 108 and in between the two rings 116. For example, the aperture of the bracket 100 may be located between the two rings 116.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle trailer hitch assembly comprising:
    a tubular beam including a first end for disposal within a first frame bracket, a second end for disposal within a second frame bracket, and a lowered portion therebetween for mounting a trailer hitch, and defining a through-hole at one of the ends located centrally between rings of one of the brackets; and
    a barrel nut within the through-hole and secured to the tubular beam without contacting the rings.

2. The assembly of claim 1, wherein the first frame bracket defines a first ring sized to receive the first end of the tubular beam, and wherein the second frame bracket defines a second ring sized to receive the second end of the tubular beam.

3. The assembly of claim 1, wherein the barrel nut is secured to the tubular beam via welding.

4. The assembly of claim 1, wherein each of the first end of the tubular beam and the second end of the tubular beam is located adjacent a C-pillar regions defined by a vehicle frame of which the trailer hitch assembly is secured to.

5. The assembly of claim 1, wherein the tubular beam defines a substantially square profile.

6. The assembly of claim 1, wherein the barrel nut defines a cavity is sized to receive a tow hook.

7. The assembly of claim 1 further comprising:
    a fascia mounted to the frame brackets to partially conceal the tubular beam and defining a cover hole in substantial registration with the through-hole; and
    a cap sized for mounting to the fascia at the cover hole to prevent access to the barrel nut.

8. An assembly for a rear portion of a vehicle comprising:
    frame rails supporting a vehicle frame;
    a first frame bracket defining a first pair of rings and secured to one of the frame rails;
    a second frame bracket defining a second pair of rings and secured to another of the frame rails;
    a tubular beam spanning between and secured to the frame brackets via the rings, including a central lowered portion, and defining a beam through-hole located between one of the first pair of rings or the second pair of rings;
    a C-shaped bracket defining an aperture in substantial registration with the beam through-hole and including a first member secured to an upper outer portion of the tubular beam and a second member secured to a lower outer portion one of the first frame bracket or the second frame bracket;
    a trailer hitch secured to the central lowered portion; and
    a cylindrical nut sized for disposal within the beam through-hole and the aperture and defining a cavity sized to receive a vehicle component.

9. The assembly of claim 8, wherein the tubular beam defines a shape extending downward at an angle from a first end to the central lower portion and extending downward at an angle from a second end to the central lower portion such that the central lower portion is offset from the first end and the second end.

10. The assembly of claim 8, wherein the tubular beam defines a substantially square profile.

11. The assembly of claim 8, wherein each of the first pair of rings and the second pair of rings are located adjacent one of two C-pillar regions of the vehicle frame.

12. The assembly of claim 8, wherein the cavity is sized to receive a tow hook.

13. The assembly of claim 8 further comprising:
    a fascia mounted to the vehicle frame to at least partially conceal the tubular beam and defining an aperture in substantial registration with the beam through-hole and the aperture; and
    a cap sized for mounting to the fascia and covering the aperture to prevent access to the cylindrical nut.

14. A vehicle comprising:
    a vehicle frame including C-pillar regions and a pair of frame rails; and
    a trailer hitch assembly comprising
        a tubular beam including a first end located adjacent one of the C-pillar regions, a second end adjacent another of the C-pillar regions, and a central portion between the first end and the second end, and the tubular beam defining a beam through-hole at one of the ends,
        a pair of frame brackets, each secured to one of the frame rails and each defining a ring portion sized to receive one of the tubular beam ends,
        a C-shaped bracket defining an aperture in substantial registration with the beam through-hole and including a first member secured to an upper outer portion of the tubular beam and a second member secured to a lower outer portion of one of the pair of frame brackets; and
        a nut sized for disposal within the beam through-hole and defining a cavity to receive a vehicle component therein.

15. The vehicle of claim 14 further comprising a trailer hitch secured to the central portion of the tubular beam.

16. The vehicle of claim 14, wherein a central axis defined by the nut is parallel with a longitudinal axis defined by one of the pair of frame rails.

17. The vehicle of claim 14, wherein an inner surface of the cavity of the nut is threaded to receive the vehicle component.

18. The vehicle of claim 14, wherein the central portion of the tubular beam is offset and lower than the first and second ends of the tubular beam relative to an underlying surface.

* * * * *